(12) United States Patent
Grach et al.

(10) Patent No.: US 6,923,348 B2
(45) Date of Patent: Aug. 2, 2005

(54) PUMP WITH PNEUMATIC MOTOR

(75) Inventors: Ayzik Grach, Chesterfield, MO (US); Viktor V. Alekseyev, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 46 days.

(21) Appl. No.: 10/685,056

(22) Filed: Oct. 14, 2003

(65) Prior Publication Data

US 2004/0129735 A1 Jul. 8, 2004

Related U.S. Application Data

(63) Continuation-in-part of application No. 10/086,394, filed on Mar. 1, 2002, now Pat. No. 6,736,292.

(51) Int. Cl.[7] .............................................. G01F 11/00
(52) U.S. Cl. ........................ 222/262; 222/334; 417/553; 92/181 R
(58) Field of Search ................................. 222/256–263, 222/327, 334, 372, 386; 92/181 R, 182, 183; 417/511, 553; 251/62–63.3; 411/427, 432

(56) References Cited

U.S. PATENT DOCUMENTS

| | | | |
|---|---|---|---|
| 1,381,224 A | * | 6/1921 | Petricone .................... 417/511 |
| 1,965,038 A | | 7/1934 | Hartman |
| 2,183,013 A | | 12/1939 | Davis |
| 2,254,716 A | | 9/1941 | Veit |
| 2,505,839 A | | 5/1950 | Scovell |
| 2,928,574 A | | 3/1960 | Wagner |
| 2,985,359 A | * | 5/1961 | Hanje .......................... 417/511 |
| 3,218,980 A | | 11/1965 | Arnes |
| 3,282,167 A | | 11/1966 | McKenzie |
| 3,319,577 A | * | 5/1967 | Herreshoff .................. 417/511 |
| 3,325,995 A | | 6/1967 | Buhro |
| 3,448,658 A | | 6/1969 | Arnes |
| 3,597,121 A | | 8/1971 | McClocklin |
| 3,980,209 A | * | 9/1976 | Collar ......................... 222/323 |
| 4,150,819 A | | 4/1979 | Taylor |
| 4,328,972 A | | 5/1982 | Albertson et al. |
| 4,352,644 A | | 10/1982 | Landrum et al. |

(Continued)

OTHER PUBLICATIONS

"Napa ® Lifting Equipment–Model 91–622 Shop Press (50 Ton) Series B" Owners Manual, Copyright 1990, One Lincoln Way, St. Louis, MO 63120–1578 (pp. 1,3,4 and 6).

Parker Packing, "Recommended Installation Chamfer for PSP Seals", Apr. 7, 1983, Parker Packing, Salt Lake City, Utah, (2 Pages).

Photographs of Y–13 Series Air/Hydraulic Pump, OTC ® Tools & Equipment, Division of Owatonna Tool Company, Owatonna Minnesota 55060, Undated, (11 Pages).

Parker Hannifin Corp., Mollyguard Wear Rings, Parker Seals, 1993, Cover page with six pages and a back cover page, Parker Hannifin Corp., Cleveland, Ohio, U.S.A.

Parker Hannifin Corp., PSP Seals Bi–Directional Piston Seal, Engineered Polymer Systems Division Product Bulletin, 2001, two pages, Parker Hannifin Corp., Cleveland, Ohio, U.S.A.

Primary Examiner—Michael Mar
Assistant Examiner—Patrick Buechner
(74) Attorney, Agent, or Firm—Senniger Powers

(57) ABSTRACT

A pump having a compressed-air-operated reciprocating motor for reciprocating a pump plunger through forward and return strokes. The motor comprises a motor cylinder and a motor piston operable in the cylinder and itself acting as a valve for effecting its return through each return stroke. A fluid dispenser is driven by the plunger between a charge position for charging a dispensing chamber with fluid and a discharge position for discharging fluid.

12 Claims, 16 Drawing Sheets

U.S. PATENT DOCUMENTS

| | | |
|---|---|---|
| 4,402,383 A | 9/1983 | Bailey |
| 4,826,050 A * | 5/1989 | Murphy et al. ............. 222/175 |
| 5,067,591 A | 11/1991 | Fehlig |
| 5,341,723 A | 8/1994 | Hung |
| 5,474,214 A | 12/1995 | Chung et al. |
| 5,779,105 A | 7/1998 | Brown et al. |
| 5,924,602 A | 7/1999 | Brown et al. |
| 6,012,377 A | 1/2000 | Hung |
| 6,494,347 B1 | 12/2002 | Yeh |
| 6,736,292 B2 * | 5/2004 | Grach et al. ................ 222/262 |

* cited by examiner

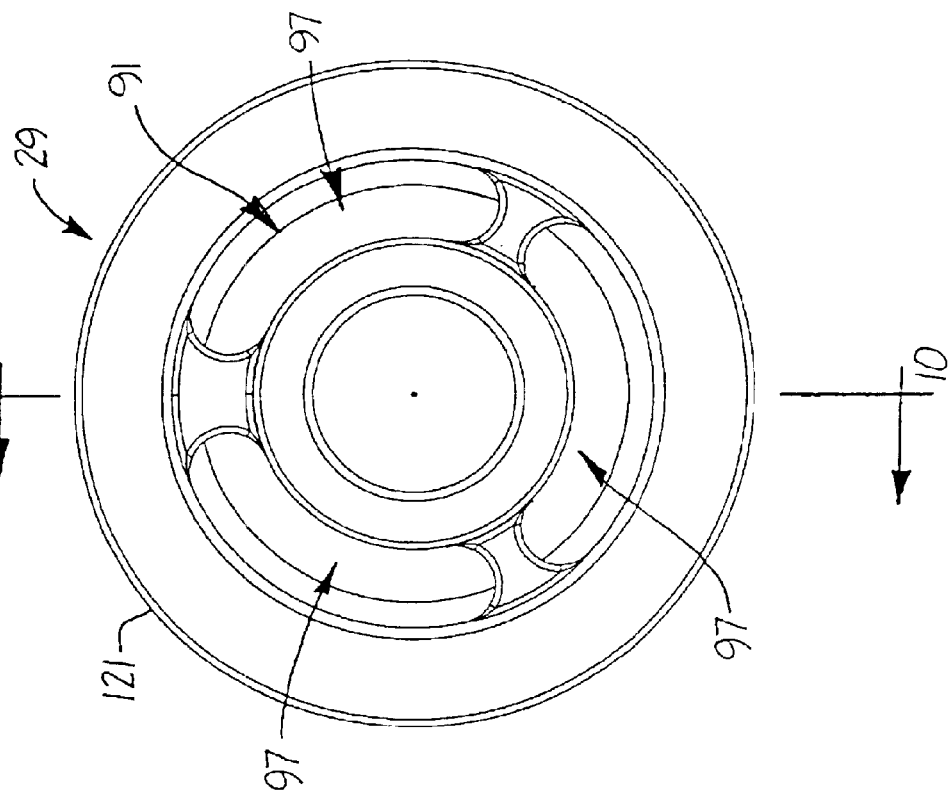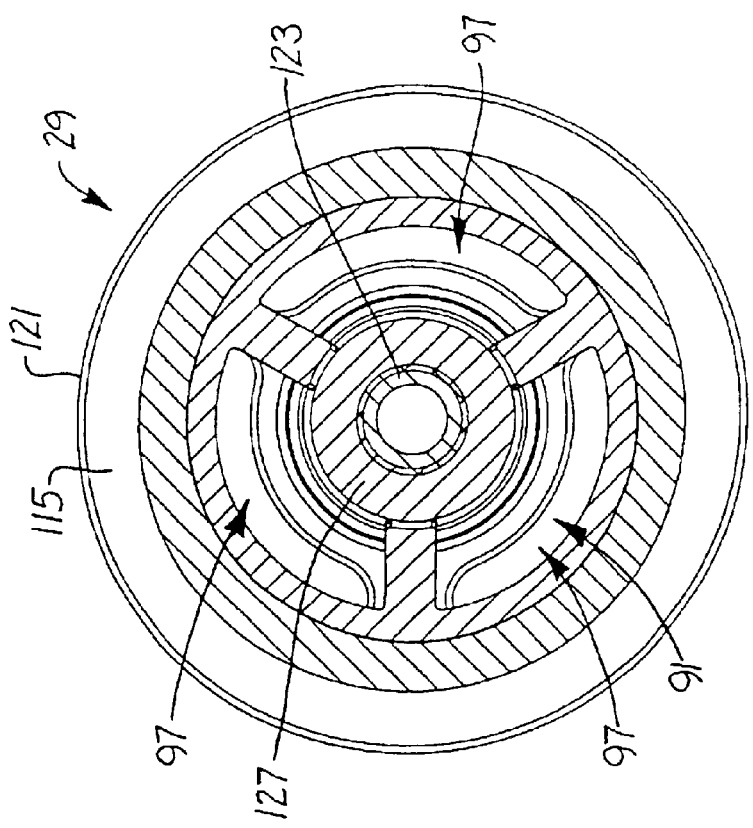

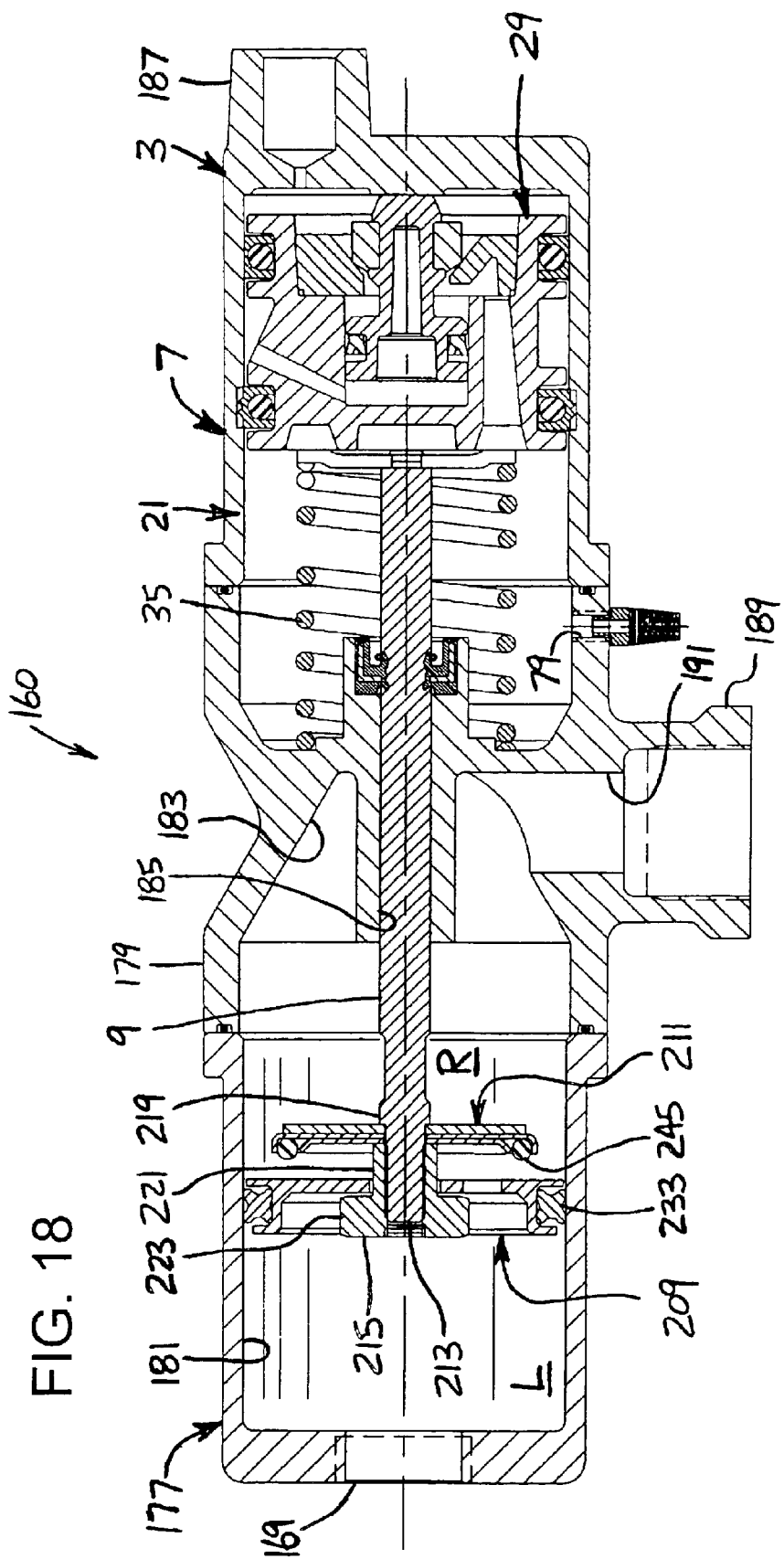

PUMP WITH PNEUMATIC MOTOR

CROSS-REFERENCE TO RELATED APPLICATION

This application is a continuation-in-part of U.S. application Ser. No. 10/086,394, filed Mar. 1, 2002 now U.S. Pat. No. 6,736,292.

BACKGROUND OF THE INVENTION

This invention relates generally to a pneumatic (compressed-air-operated) reciprocating motor, and more particularly to pumping apparatus incorporating the motor for pumping a fluid.

In one embodiment, the invention involves an air operated liquid pump of the type disclosed in U.S. Pat. No. 5,924,602, issued Jul. 20, 1999, entitled Air Operated Liquid Pump. In another embodiment, the invention involves a grease gun of the type disclosed in the co-assigned U.S. Pat. No. 5,779,105, issued Jul. 14, 1998, entitled Air Operated Grease Gun ("the '105 patent"), having been developed as an improvement on the commercial version of the gun disclosed in the '105 patent. While the liquid pump and grease gun disclosed in these patents have been generally satisfactory, they are subject to breakage and shortened life, necessitating early repair. Further, the plunger of the motor has a tendency to jam on occasion.

SUMMARY OF THE INVENTION

Among the several objects and features of the present invention may be noted the provision of a pneumatic pump, i.e., a compressed-air-operated pump for pumping a fluid; the provision of such a pump having a pneumatic reciprocating motor used in the pump having a long useful life (without repair); the provision of such a pump having a reciprocating pump plunger which inhibits jamming; and the provision of such a pump which is relatively light in weight, low in noise during operation, and economical to manufacture.

In general, a pump of the invention for dispensing a fluid comprises a pneumatic reciprocating motor, a dispenser, and a reciprocal plunger driven by the motor. The motor comprises a motor cylinder having a head end and a rod end. A motor piston is reciprocable in the cylinder, the motor piston having a forward and a back side. The motor piston is reciprocable through a forward stroke toward the rod end of the cylinder and a return stroke back toward the head end and is biased to return back through a return stroke. The plunger extends forward from the motor piston through the rod end of the cylinder and is reciprocable by the motor piston. The cylinder has an air inlet for admission of compressed air thereto on the back side of the motor piston for driving it forward through a forward stroke against the return bias and an air outlet on the forward side of the motor piston for venting air. The motor piston has through passaging extending from its forward side to its back side. A valve is movable in the motor piston relative to the motor piston between a position blocking the through passaging and a position unblocking the through passaging. The cylinder and motor piston have auxiliary passaging for delivery of air under pressure from the back side of the motor piston to move the valve to its through-passaging-unblocking position at the conclusion of a forward stroke of the motor piston. The motor piston acts as a valve and opens the auxiliary passaging at the conclusion of the forward stroke of the motor piston. The dispenser comprises a dispensing chamber, a dispensing piston in the dispensing chamber and supported by the plunger for reciprocal movement in response to reciprocal movement of the plunger. The dispensing piston is further moveable relative to the plunger between a charge position for charging the dispensing chamber with fluid and a discharge position for discharging fluid from the dispensing chamber.

In another aspect, an automatic pressure operated fluid dispenser of the invention comprises a dispensing chamber, a reciprocally movable drive plunger, the plunger having a tip. A dispensing piston is in the dispensing chamber supported by the plunger for reciprocal movement in response to reciprocal movement of the plunger. The dispensing piston has at least one flow-through hole passing through the dispensing piston. The dispensing piston is further moveable relative to the plunger between a charge position for charging the dispensing chamber with fluid and a discharge position for discharging fluid from the dispensing chamber. A seal in the dispensing chamber is secured to the plunger for reciprocal movement along with reciprocal movement of the plunger. The seal is positioned such that when the dispensing piston is at its charge position, the seal is spaced from the dispensing piston and fluid may flow through the flow-through hole. When the dispensing piston is at its discharge position, it engages the seal preventing flow of fluid through the flow-through hole. A nut is receivable on the tip having a smooth exterior surface for supporting the dispensing piston and a head. The tip of the plunger has external threads and the nut has complementary internal threads for securement on the tip.

Other objects and features of the present invention will be in part apparent and in part pointed out hereinafter.

BRIEF DESCRIPTION OF THE DRAWINGS

FIG. 8 is a transverse section of the motor piston taken generally on line 8—8 of FIG. 7;

FIG. 9 is a left end view of FIG. 7;

FIG. 18 is an enlarged section of the pump but showing the dispensing piston at a charge position;

Corresponding reference characters indicate corresponding parts throughout the views of the drawings.

DETAILED DESCRIPTION OF THE PREFERRED EMBODIMENT

Figure 1:
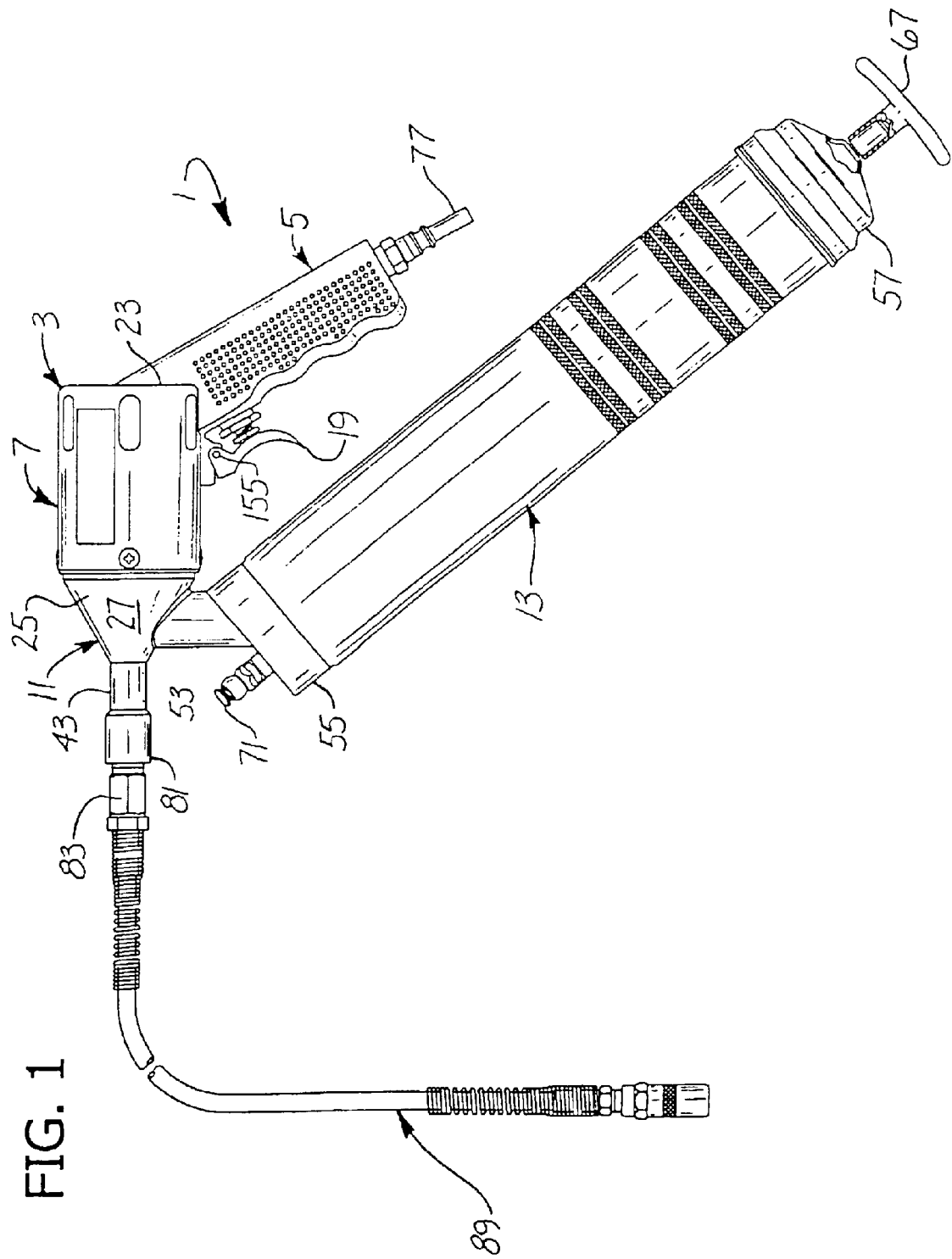
FIG. 1 is a view in side elevation of a grease gun embodying the invention.

Referring now to the drawings and in particular to FIG. 1, a grease gun of this invention, designated 1 in its entirety, is shown to comprise a motor/pump unit, designated 3 in its entirety, at the upper end of a knurled pistol-grip handle 5, extending forward from the handle. The motor/pump unit comprises pneumatically operated (compressed-air-operated) reciprocating motor 7 for reciprocating a plunger 9 (see FIGS. 3–5) of a pump 11 back and forth for pumping grease from a grease supply container 13 appended to the pump 11 extending down therefrom and angled toward the handle. Compressed air for operating the motor 7 for reciprocation of the plunger 9 is supplied to the motor through passaging 15 in the handle 5 under control of a valve 17 operable by a trigger 19.

Figure 3:
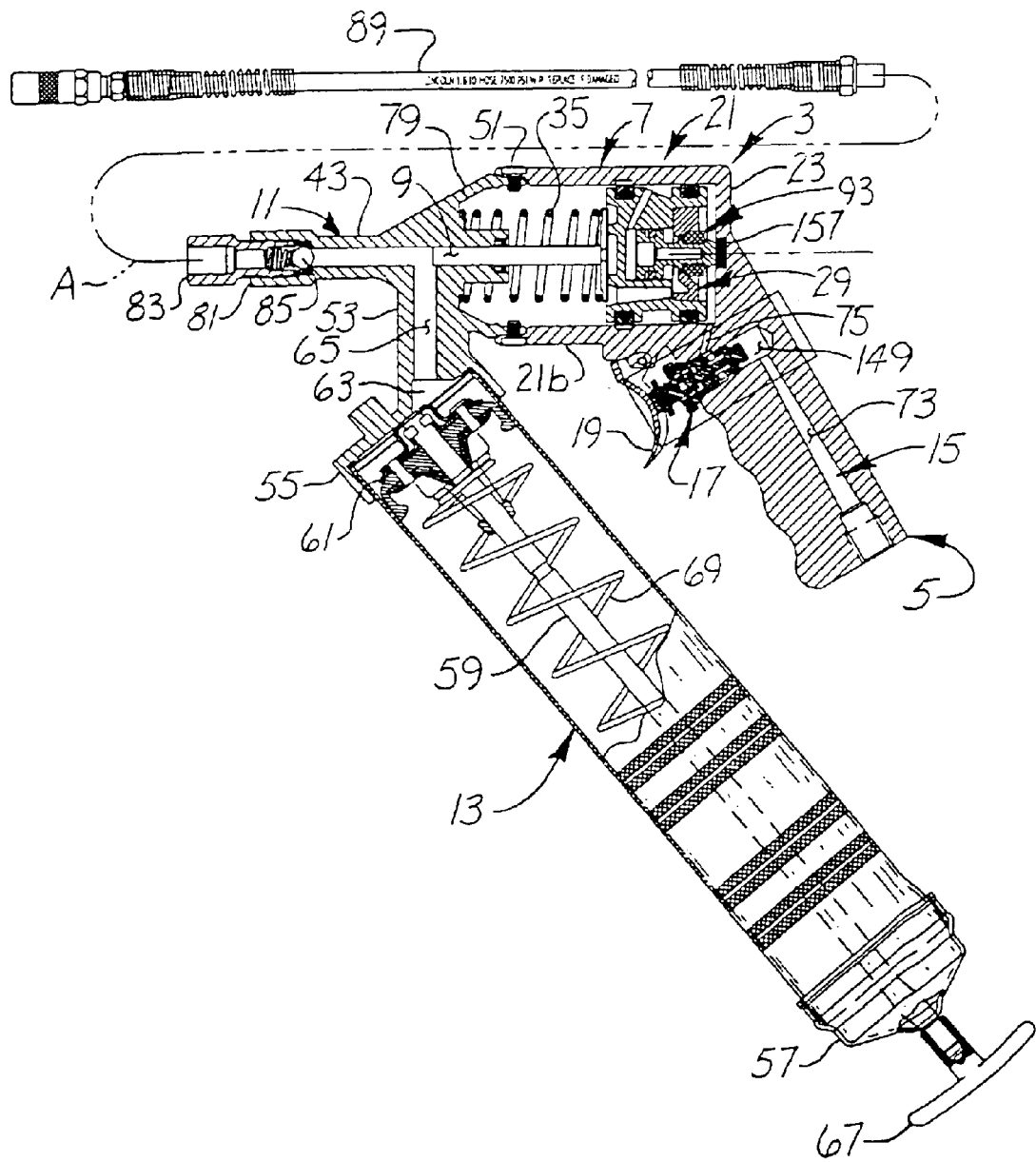
FIG. 3 is a view generally in section on line 3—3 of FIG. 2.
Figure 4:
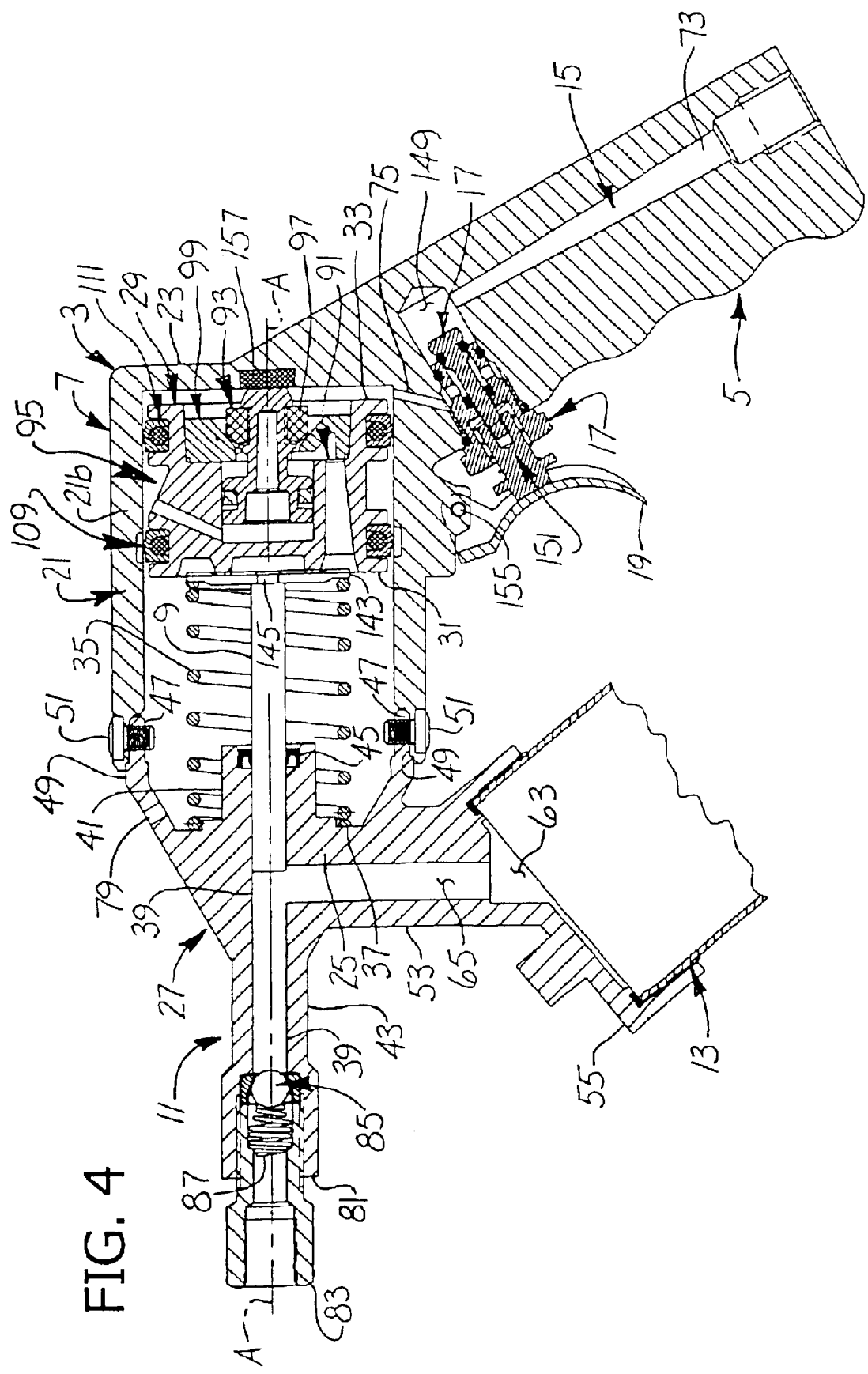
FIG. 4 is an enlarged fragment of FIG. 3.
Figure 5:
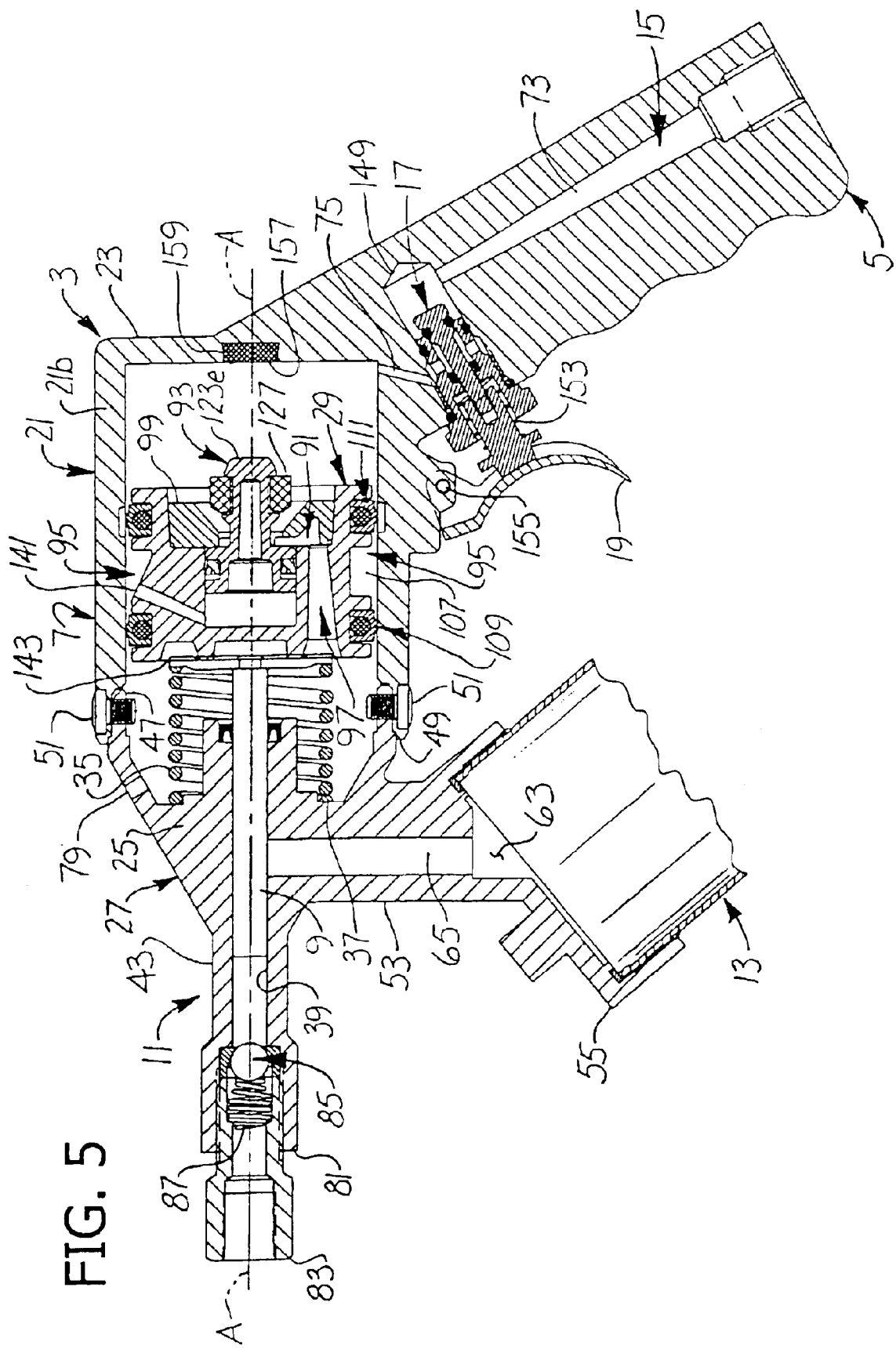
FIG. 5 is a view corresponding to FIG. 4 showing a moved position of parts.
Figure 7:
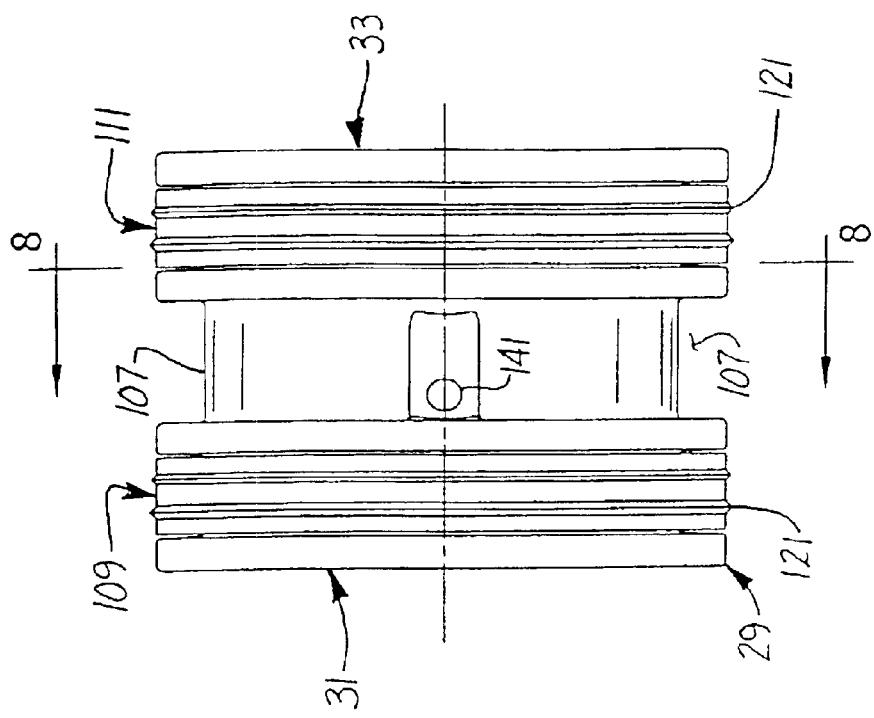
FIG. 7 is a view in side elevation of the motor piston.
Figure 6:
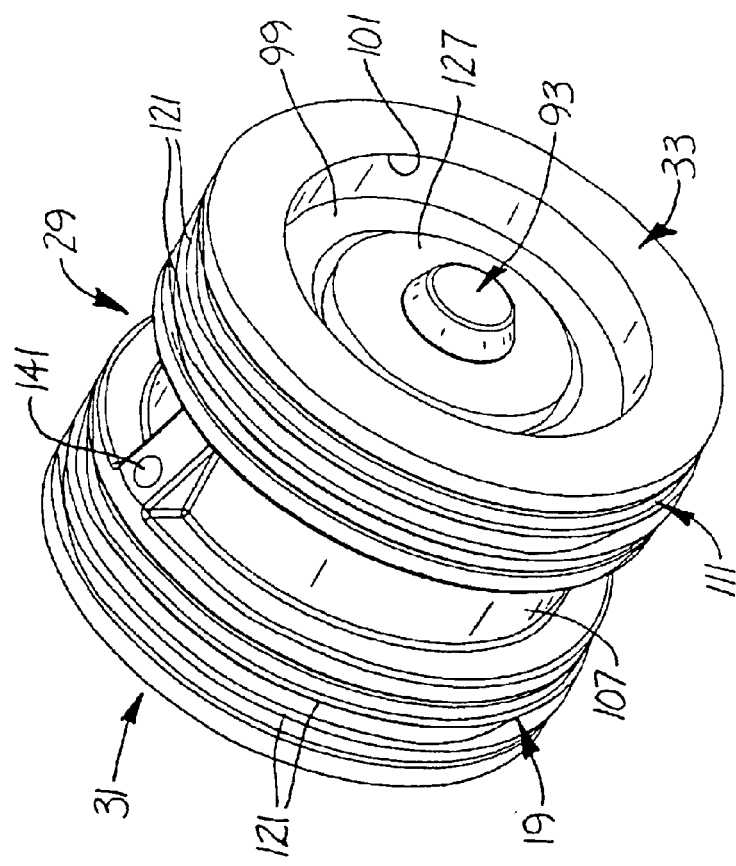
FIG. 6 is a perspective of a motor piston of the grease gun.
Figure 11:
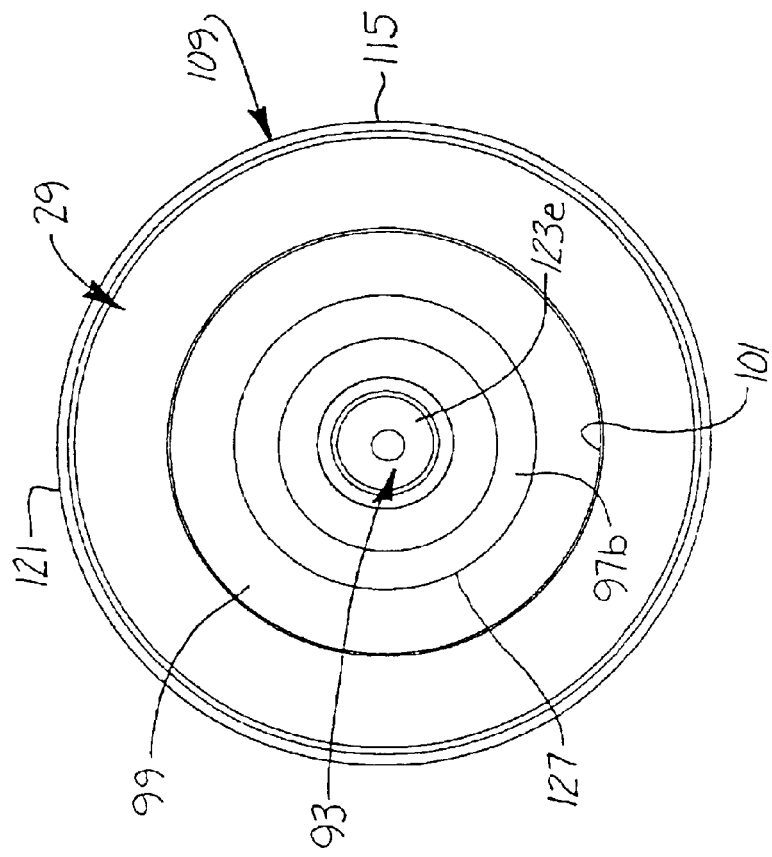
FIG. 11 is a right end view of FIGS. 7 and 11.

The motor comprises a cylinder 21 extending forward from the upper end of the pistol-grip handle 5, the axis of the cylinder being indicated at A—A in FIGS. 3–5. As shown in FIGS. 3–5, the cylindrical body 21b and head end 23 of the cylinder (its rearward end) and the pistol-grip handle 5 are of integral construction, preferably being made as one piece from a suitable material such as ANSI 380 die cast aluminum alloy. The rod end 25 (the forward end) of the cylinder is an attached component, as will be subsequently detailed, constituted by part of the body 27 of pump 11.

A piston 29, which is preferably made of a suitable plastic, such as a polyamide, is reciprocable in the cylinder 21. The piston 29, constituting the motor piston, has a forward side 31 and a back side 33 (FIGS. 6–11). It is reciprocable through a forward stroke from the retracted position of FIGS. 3 and 4 adjacent the head end 23 of the cylinder 21 toward the rod end 25 of the cylinder to the extended position shown in FIG. 5, and through a return stroke back toward the head end 23, being subject to the bias of a spring 35 to return it back through the return stroke. The spring 35 is a coil compression spring extending axially in the cylinder seated at its forward end as indicated at 37 on the rod end 25 of the cylinder and acting against the piston to bias it rearward in the cylinder. The pump plunger 9 is comprised by the piston rod of the motor, the plunger or piston rod 9 extending forward from the piston through an axial bore 39 in the rod end 25 of the cylinder 25, including an axial projection 41 extending rearward from the rod end 25, and through an elongate forward extension 43 constituting the pump tube of the pump body 27. A seal 45 is provided for the plunger at the rearward end of projection 41. The forward end of spring 35 surrounds projection 41. The rod end 25 of the cylinder 21, constituted by the rearward part of the pump body 27, has a rearwardly extending annular wall 47 extending into an annular internal groove 49 in the forward end of cylinder 21. The wall 47 is secured in the groove 49 as by screws 51.

Figure 2:
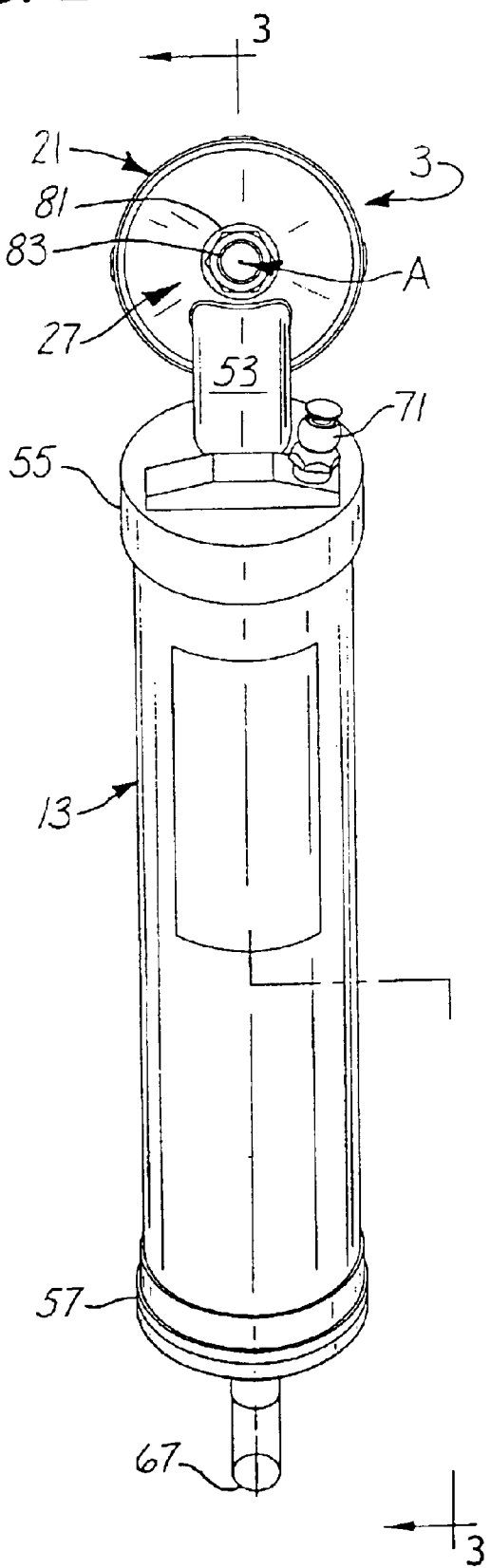
FIG. 2 is an end view of the gun as viewed from the left of FIG. 1 omitting a hose.

In the embodiment shown in FIG. 3, the pump body 27 has a downwardly extending protuberance 53 formed at the lower end thereof with an internally threaded cap 55 for closing the upper end of the grease supply container 13 and for attaching the container to the gun 1. The container 13 is a cartridge-type grease container comprising an elongate cylindrical receptacle having a lower end cap 57. In the receptacle at the upper end of a follower rod 59 is a follower 61 for forcing the supply of grease in the receptacle upward and out through a hole 63 in the cap 55 and a grease passage 65 in the protuberance 63 into the bore 39. The follower rod 59 is slidable in the cap 57 and has a handle 67 for pulling it out against the bias of a spring 69 in the receptacle and being turned to lock it in fully extended position by conventional means. The receptacle is supplied loaded with grease (the follower 61 being fully retracted by the follower rod 59 against the bias of spring 69) and is closed at what amounts to its upper end by a plastic cap. With the plastic cap removed, the receptacle is screwed at its upper end into the cap 55 and the follower rod 59 and follower 61 released to urge the grease in the receptacle upward in response to the upward bias of spring 69. The cap 55 is provided with a vent valve 71 (FIGS. 1 and 2).

In one embodiment, passaging 15 comprises a passage 73 extending from the end of the handle 5 to the valve 17 and passage 75 extending from the valve 17 to the cylinder 21 constituting an air inlet for the cylinder for supplying compressed air thereto in back of the piston 29. A compressed air hose 77 such as the usual shop air hose (see FIG. 1) is connected to the lower end of the handle 5 for supplying compressed air to passage 73, thence to the air inlet 75 of the cylinder on operation of the trigger 19 to open valve 17 for communication of passages 73 and 75. Cylinder 21 is shown as having an air outlet 79 on the forward side of piston 29 for venting air. It may have more than one. In an alternate embodiment shown in FIG. 18, the air outlet 79 is fitted with a muffler for restricting flow and reducing noise. The muffler is formed of a suitable material such as a sintered bronze.

The pump tube 43 has a slightly enlarged outer or distal end 81 containing a fitting 83 in which there is a check valve 85 biased by spring 87 toward closure of the pump tube bore 39. With the motor piston 29 in retracted position (FIG. 4), the forward end of the pump plunger 9 (the piston rod) lies rearward of the grease passage 65. The arrangement is such that, passage 65 and bore 39 being primed with grease, on a forward stroke of the pump plunger 9 (to the left as viewed in FIG. 4) in bore 39, a shot of grease is forced out of the fitting 83, the check valve 85 opening for the delivery. A lubricant delivery hose 89 may be connected to the fitting 83.

The motor piston 29, shown per se in FIGS. 6–11, has passaging, designated 91 in its entirety, extending therethrough from its forward side 31 to its backside 33. A valve, designated 93 in its entirety, is movable in the motor piston relative to the motor piston between the FIGS. 3, 4, 10 position blocking passaging 91 and the FIG. 5 position unblocking passaging 91. The cylinder 21 and piston 29 have passaging designated 95 in its entirety (denoted auxiliary passaging) for delivery of air under pressure from the chamber in the cylinder 21 on the back side of the motor piston to move the valve 93 from its FIG. 4 position blocking through passaging 91 to its FIG. 5 position unblocking through passaging 91 at the conclusion of a forward stroke of the motor piston 29, the motor piston 29 itself acting as a valve and opening the valve-pressurizing passaging 95 at the conclusion of the forward stroke of the motor piston.

Figure 10:
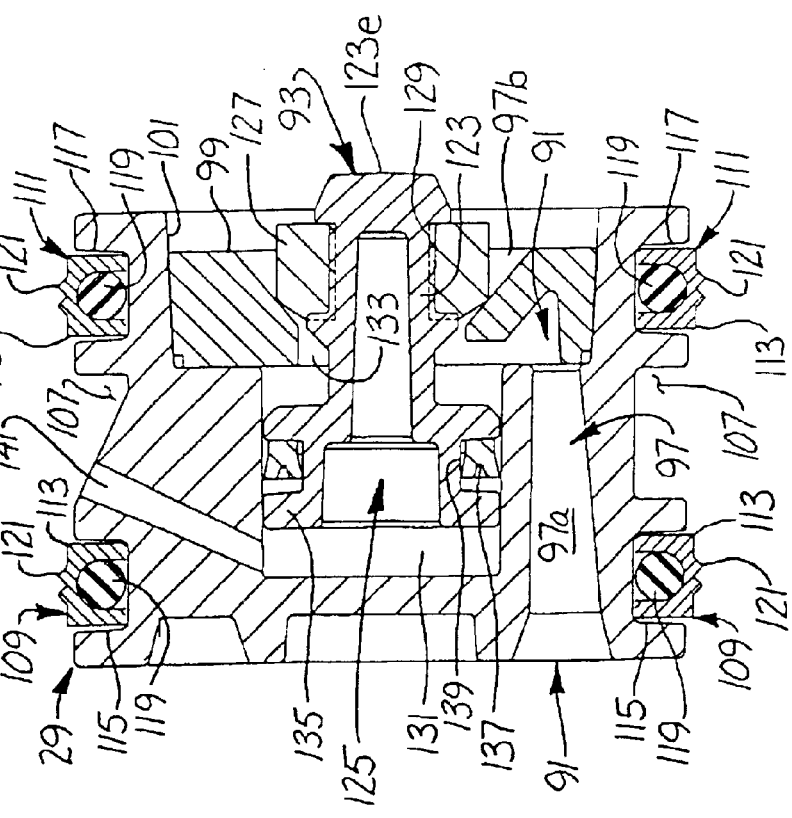
FIG. 10 is a longitudinal section of the piston taken generally on line 10—10 of FIG. 9.

The through passaging 91 in the motor piston 29 comprises three passages each designated 97 extending lengthwise of the motor piston spaced at intervals (e.g., 120° intervals) around the axis of the motor piston (which coincides with axis A—A of the cylinder 21). As shown in FIG. 10, each passage 97 has a forward component 97a extending lengthwise of the piston in the body of the piston and a rearward end component 97b in an insert 99 constituting a valve seat secured in a recess 101 in the rear end of the piston and constituting a part thereof. The valve 93 is movable axially in and relative to the motor piston 29 between its FIG. 4 position engaging the valve seat 99 blocking the through passaging 91 (i.e. blocking all three through passages 97) and its FIG. 5 position unblocking the through passaging 91 (i.e unblocking all three through passages 97). The specific configuration of the through passaging 91 may vary without departing from the scope of this invention.

The aforesaid auxiliary passaging 95 comprises, in one embodiment, an internal recess 105 in the cylinder 21 and an external recess 107 in the motor piston 29. The recess 105 is an annular recess extending all around the interior of the cylinder 21 spaced from the head end 23 of the cylinder 21 a distance defining the forward stroke of the piston 29. Alternatively, the recess 105 can be comprised of a plurality of separate, arcuate recesses which are circumferentially spaced in arrangement around the interior of the cylinder 21, or a single recess which extends around only a portion of the entire circumference. The recess 107 is an annular recess extending all around the periphery of the piston 29 between a forward seal 109 on the piston adjacent its forward end and a rearward seal 111 on the piston adjacent its rearward end for slidingly sealing the piston in the cylinder 21. Each seal 109, 111 comprises a flexible channel-section ring 113 (see FIG. 10) seated in a peripheral groove 115, 117 in the piston 29, ring 113 having an elastomeric (rubber) ring 119 therein. The periphery of ring 113 (which seals against the interior cylindrical surface of the cylinder 21) has a ribbed formation 121.

Referring again to FIG. 10, the valve 93 of a preferred embodiment has a stem 123 slidable in a hole designated 125 in its entirety extending longitudinally of the motor piston 29 on the axis A—A of the cylinder 21 (and the piston 29). The stem 123 has a head 127 thereon adjacent its rearward end engageable with the valve seat 99 to close off the through passaging 91, more particularly to close off the three passages 97 at their rearward ends in the valve seat 99. The head 127 comprises an annular elastomeric (e.g. grease-resistant rubber) member set in a groove 129 adjacent the rearward end 123e of the stem. The hole 125 has a forward end portion 131 formed as and constituting an auxiliary cylinder and a rearward end portion 133. The valve stem 123 is formed as piston 135 (denoted the auxiliary piston) at its forward end, the auxiliary piston 135 being sealingly slidable in the auxiliary cylinder 131 in the motor piston 29, the auxiliary piston 135 having a seal 137 retained in a groove 139 therein. Passaging 103 includes an angled passage 141 extending from recess 107 in the motor piston 29 to the auxiliary cylinder 131 on the forward side of the auxiliary piston 135.

The coil compression motor piston return spring 35 acts on the forward end of the motor piston 29 at the rearward end of the spring 35 (its right end as illustrated in FIGS. 3, 4, 5 and 10) via a spring seat 143 constituted by a disk slidable radially in all directions on the forward face of the motor piston 29. The piston rod 9 (the pump plunger) extends forward from the disk, having a reduced-diameter rearward end 145 received in a central hole in the disk. This arrangement avoids jamming of the piston rod 9 (the plump plunger).

The detailed construction of the compressed air inlet valve 17 is not critical, and it should suffice to point out that as best shown in FIGS. 4, 5, 13, and 14 it comprises a valve seat 147 in a recess 149 in the handle 5 supplied with compressed air via passage 73 in the handle, and a valve member assembly 151 biased by spring 153 to a closed position blocking passage 75 from passage 73 and movable on pulling the trigger 19 to an open position for delivery of compressed air via passage 15 to the back end of the motor cylinder 21. The trigger is pivoted at 155 on the handle 5.

Operation is as follows:

On pulling the trigger 19, and maintaining it pulled, compressed air is supplied from the shop hose 77 via passage 73, the trigger-operated valve 17 and passage 75 to the chamber in the cylinder 21 on the back side 33 of the motor piston 29. The motor piston 29 is thereupon relatively rapidly reciprocated in cycles each involving a forward stroke of the motor piston 29 from the FIG. 4 (and FIG. 3) retracted position adjacent the head end 23 of cylinder 21 to the FIG. 5 forward position, and a return stroke back to the FIG. 4 retracted position. The valve 93 in the motor piston is closed for each forward stroke (how will be made subsequently clear) blocking the through passaging 91 (all three through passages 97) in the motor piston 29 and thereby keeping compressed air on the back side 33 of the motor piston from escaping through passaging 91 and enabling the forward stroke. In moving through the forward stroke, the motor piston 29 compresses spring 35, thereby augmenting its force biasing the piston 29 rearward. The motor chamber on the front side 31 of the motor piston is vented via the vent (or vents) 79 on each forward stroke of the motor piston 29. The blocking of the through passaging 91 (the three passages 97) occurs by reason of the engagement of the resilient valve head 127 with the valve seat 99 (see FIGS. 4 and 10).

Figure 12:
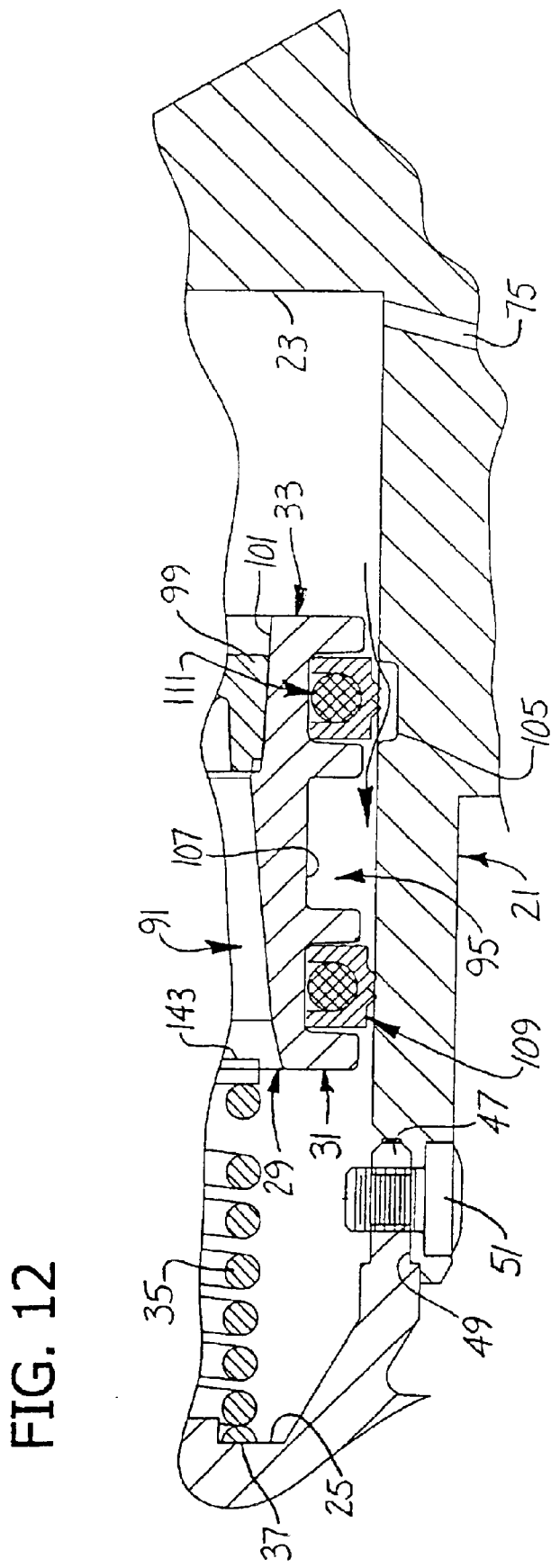
FIG. 12 is an enlarged fragment of FIG. 5.
Figure 14:
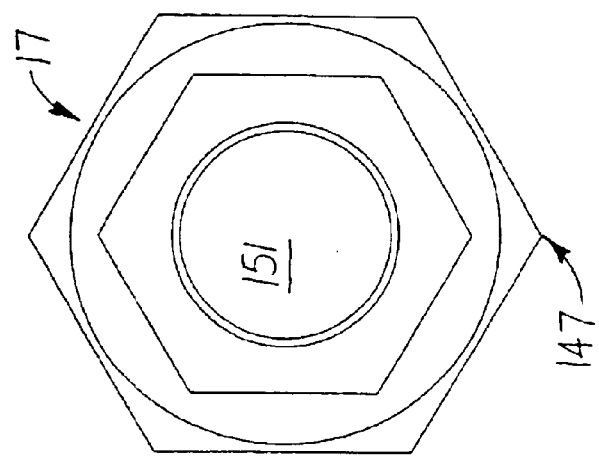
FIG. 14 is a left end view of FIG. 13.
Figure 13:
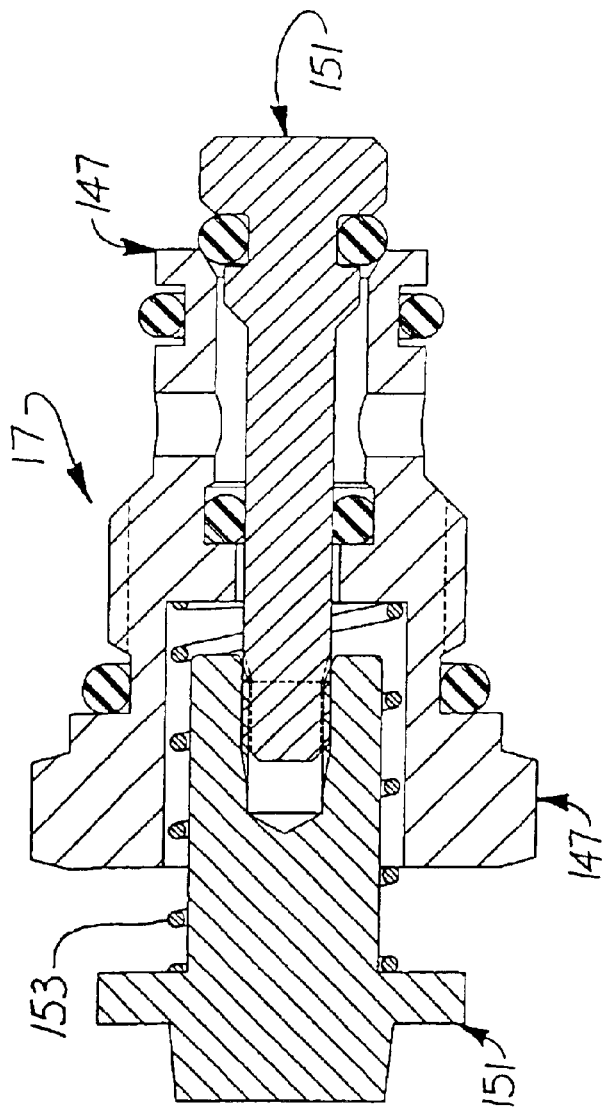
FIG. 13 is a view in section of a trigger-operated valve of the gun.

Each return (rearward) stroke of the motor piston 29 is initiated in response to the rearward motor piston seal 111 reaching the recess 105 in the cylinder 21 as shown in FIGS. 5 and 12, in the course of the forward movement of the seal 111 with the motor piston 29, allowing compressed air to flow from the chamber on the back side 33 of the motor piston 29 via auxiliary passaging 95 to the auxiliary cylinder 131 (which may be denoted the valve cylinder) on the forward side of the auxiliary piston 135 (the valve piston). This valve-actuating flow of compressed air to the auxiliary cylinder 131 is via recess 105 in cylinder 21 to recess 107 in the motor piston 29 as illustrated by the arrow in FIG. 12, and from recess 107 through passage 141 (FIG. 10) to the chamber on the forward side of the auxiliary piston 135 (the valve piston) resulting in rearward movement of valve 93 relative to the motor piston 29 to the FIG. 5 open position unblocking the through passaging 91 (passages 97), by reason of the head 127 of the valve 93 moving away from the valve seat 99. With the through passaging 91 unblocked, air escapes from the chamber in cylinder 21 on the rearward side 33 of the motor piston 29 to the chamber in cylinder 21 on the forward side of the motor piston 29 and is vented via vent hole (or holes) 79. The air pressure on the back side 33 and the air pressure on forward side of the motor piston 29 are thereby generally equalized and the motor piston return spring 35 takes over and returns (pushes) the motor piston 29 back rearward through the return stroke.

On the return of the motor piston 29, carrying with it the valve 93, the rearward end 123e of the valve 93 engages the head end 23 of the cylinder 21 and stops moving (momentarily). The motor piston 29 continues its rearward (return) movement for a brief interval, sliding rearward with respect to the now-arrested valve 93 to the point of engagement of the valve seat 99 with the valve head 127 and thereby effecting closure of the valve 93 (blocking of the through passaging 91) for the ensuing forward stroke of the motor piston. Noise level is considerably reduced by providing for sound-deadening engagement of the rearward end 123e of the valve 93 with a cushion 157 constituted by a disk of elastomeric material (e.g. rubber) lodged in a recess 159 in the head end 23 of the cylinder, as illustrated in FIGS. 4 and 5.

On each forward stroke of the motor piston 29, the piston rod 9 serving as the plunger of pump 11 moves forward through a pressure stroke crossing the pump inlet 65 to deliver a shot of grease to the fitting 83 (and thence through the hose 87), the check valve 85 opening for this delivery. And on each return stroke, the pump 11 is recharged.

Of special note is the enablement of the manufacture of the body of the motor piston 29 as an injection molded plastic part (a one-piece part) of relatively light weight, contributing to the ease of handling the gun 1. The construction also enables use of a relatively light return spring, allowing the gun to operate at relatively lower air pressure (e.g. at 40 p.s.i.). Another noteworthy feature is the ability to stall against back pressure resulting from an attempt to lubricate a blocked bearing or grease fitting.

Figure 15:
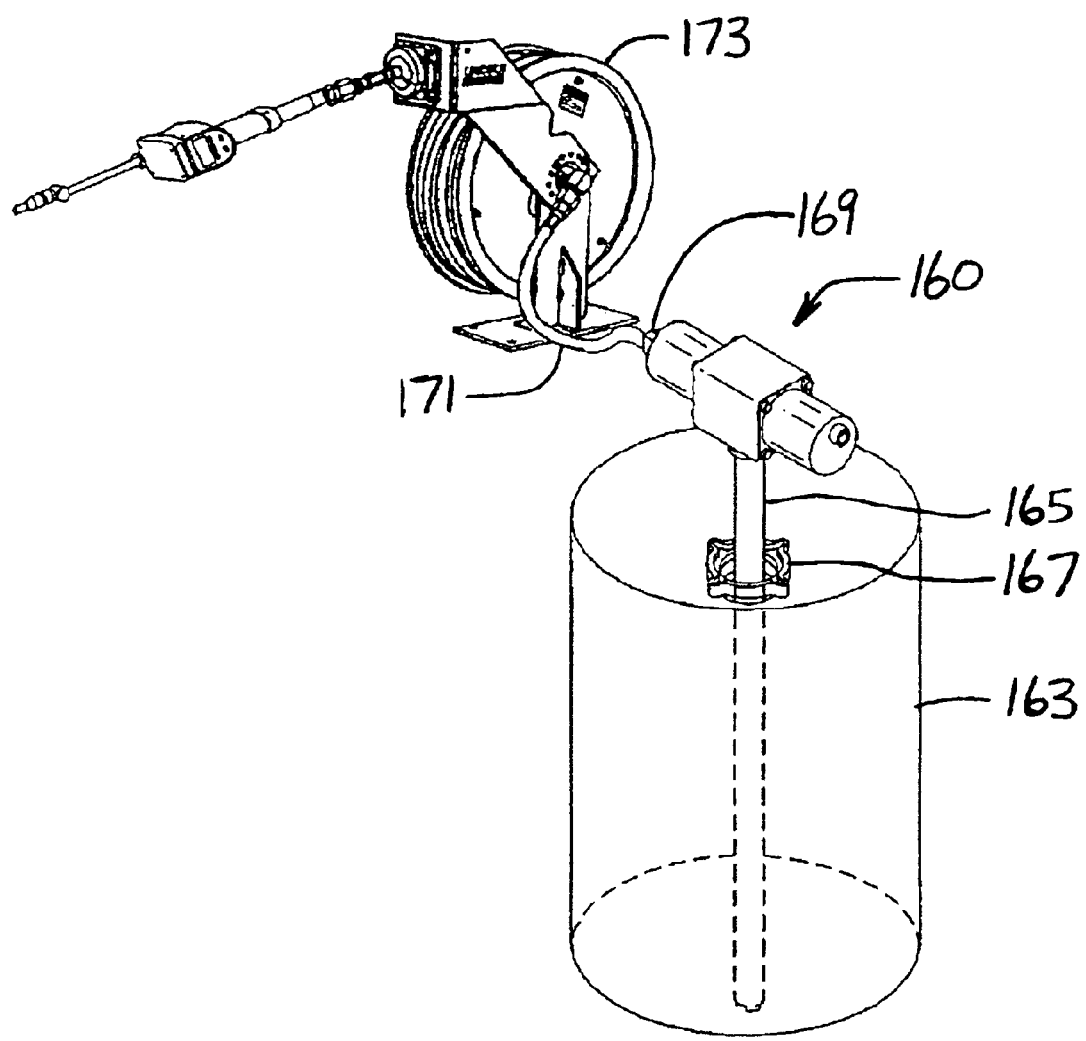
FIG. 15 is a perspective of a pump embodying the invention with an attached hose for dispensing a fluid.
Figure 16:
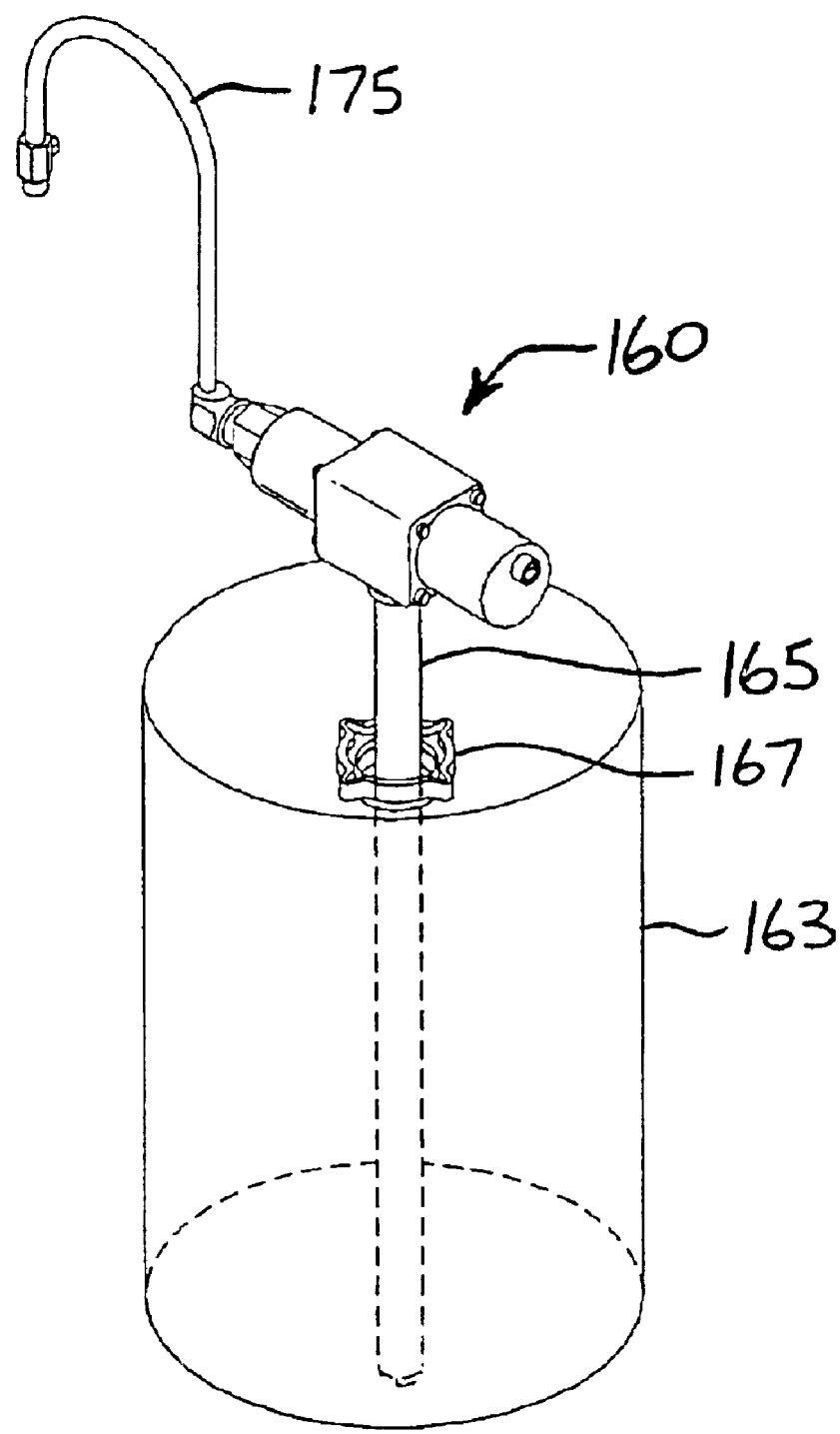
FIG. 16 is a perspective of the pump of FIG. 15 with a dispensing spigot tube.

Another embodiment of the invention, shown in FIGS. 15–22, is a pump indicated generally at 160 for dispensing a fluid. The pump is particularly suited for dispensing a low or medium viscosity fluid from a container 163. Examples of the fluid are mineral or synthetic motor oil, solvent, toluene, antifreeze, windshield washer, and transmission or brake fluid. A first application of using the pump 160 is illustrated in FIG. 15, where the pump is positioned over the container 163 with a rapid dip tube 165 for receiving fluid extending from the pump downwardly into the container. In one embodiment, the dip tube 165 has a length of about 36 inches which is sufficient to reach a bottom of many lubricant drums. It is understood that the dip tube may have any length, or may be non-rigid so that the pump may be located remote from the container or at any position relative to the container. A bung 167 is provided at an opening of the container 163 for holding the dip tube 165 at an upright orientation and preventing dirt or other contamination from entering the container around the tube. The pump 160 has an outlet 169 connected to a dispensing hose 171 mounted on a reel 173 for delivering fluid to a remote location. A second application of using the pump is illustrated in FIG. 16, where the outlet 169 is connected to a rigid spigot tube 175 for delivering fluid to a portable container (not shown).

Figure 17:
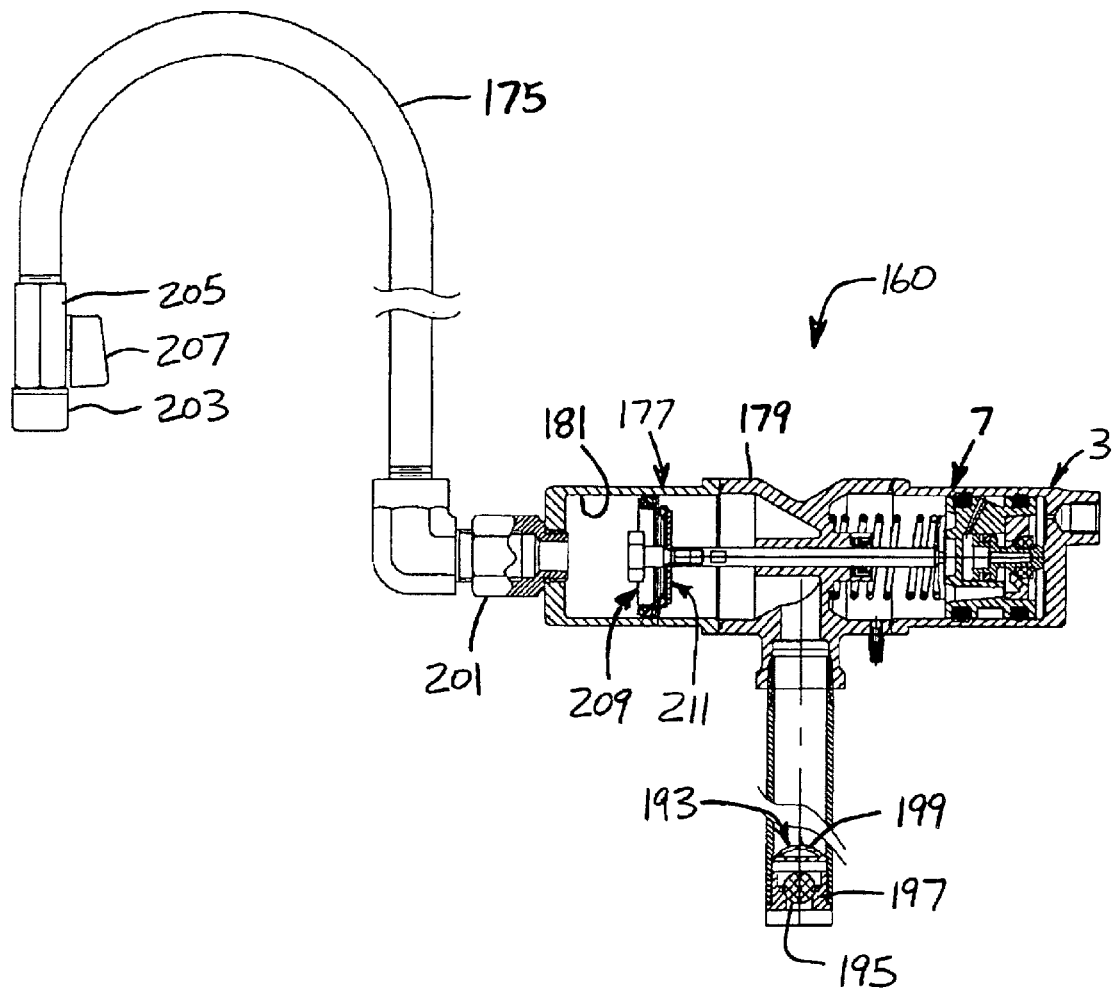
FIG. 17 is a longitudinal section of the pump of FIG. 16 showing a dispensing piston at a discharge position.

Referring to FIGS. 17 and 18, the pump 160 incorporates the pneumatic reciprocating motor 7 that was employed in the grease gun 1. As this was described earlier, the component parts and operation of the motor will not be described again here. The pump includes a dispenser, shown generally at 177, having a housing 179 that encloses both the cylinder 21 and a cylindrical dispensing chamber 181. The interior of the cylinder 21 and the interior of the dispensing chamber 181 are separated by an internal wall 183 having a plunger bore 185 passing therethrough. The plunger 9 extends in sliding engagement through the plunger bore 185 into the dispensing chamber.

A gas inlet fitting 187 is provided on the housing 179 which communicates with the head end 23 of the cylinder 21. The fitting shown has internal screw threading to accept a complimentary externally threaded coupling and air supply hose (not shown) to the housing 179 for supplying air under pressure to the cylinder 21. A separate manual control (not shown) would be provided for controlling the flow of air under pressure through the supply hose to the cylinder 21.

A fluid supply inlet fitting 189 is internally threaded to accept a complimentary externally threaded end of the dip tube 165. Fluid is directed through the supply inlet fitting 189 and a passage 191 into the dispensing chamber 181. The fittings 187 and 189 are only examples of inlets for supplying a pressurized gas and fluid to operate the pump. Other inlets or methods of providing gas and fluid may be employed without departing from the scope of this invention.

A check valve 193 (FIG. 17) is positioned in the dip tube 165 for preventing reverse flow of fluid so that a column of fluid in the dip tube will not drop back into the container 163 after the pump has made a stroke. In one embodiment, the check valve 193 is a ball valve positioned adjacent a bottom end of the dip tube. When fluid is received from the container into the dip tube, it unseats a ball 195 from its seat 197 and continues through the fluid supply inlet fitting 189 and the passage 191 into the dispensing chamber 181. The ball valve includes a stop 199 for holding the ball 195 near to the seat 197. The valve can be at other locations or have other forms without departing from the scope of this invention.

The spigot tube 175 is connected with the dispensing chamber by a coupling 201 which is screw threaded through a side wall of the housing 179 to communicate with the dispensing chamber 181. At the opposite end of the spigot tube is an aerator 203 and a valve 205 that is selectively opened and closed by manipulation of a manual handle 207.

A dispensing piston indicated generally at 209 and a cooperating seal plate indicated generally at 211 are supported on the plunger 9, as shown in FIG. 18. The dispensing piston 209 is mounted for sliding movement relative to the plunger 9, whereas the seal plate 211 is mounted in fixed position relative to the plunger 9.

Significantly, a distal end of the plunger 9 has an externally threaded tip 213. Some systems of the prior art have a tip with a cavity and internal threading which leads to small material thicknesses and is therefore prone to break. The tip 213 of the present invention is solid in construction for providing improved strength. External threads are disposed on the tip. A nut 215 having complementary internal threads is receivable on the tip 213. The seal plate 211 (FIGS. 21 and 22) has a central hole 217 receivable on the tip of the plunger. When the nut 215 is screw threaded onto the tip 213, the nut engages the seal plate 211 and tightens against it thereby holding the seal plate between the end of the nut and a shoulder 219 on the plunger 9. The seal plate 211 is secured at a fixed position on the plunger, such that the seal plate reciprocates in the dispensing chamber with the plunger.

The nut 215 has a shank with a smooth, cylindrical exterior surface 221 and an enlarged head 223. The dispensing piston 209 (FIGS. 19 and 20) has a central hole 225 sized for being received on the exterior surface 221 with a slip fit such that the dispensing piston may freely slide in the longitudinal direction along the nut 215. The dispensing piston 209 is captured on the nut 215 for longitudinal sliding movement relative to the plunger 9 between a charge position (FIG. 18) wherein the dispensing piston is spaced from the seal plate 211 and adjacent the enlarged head 223, and a discharge position (FIG. 17) wherein the dispensing piston is adjacent the seal plate and spaced from the enlarged head. Three oblong flow-through holes 227 are spatially arranged around the central hole 225.

Figure 20:
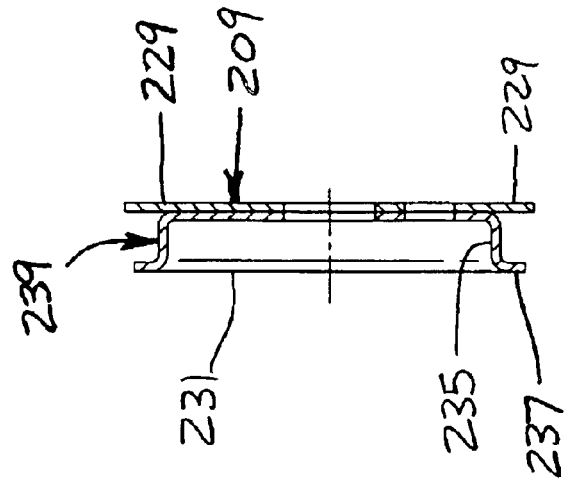
FIG. 20 is a section along line 20—20 of FIG. 19.
Figure 19:
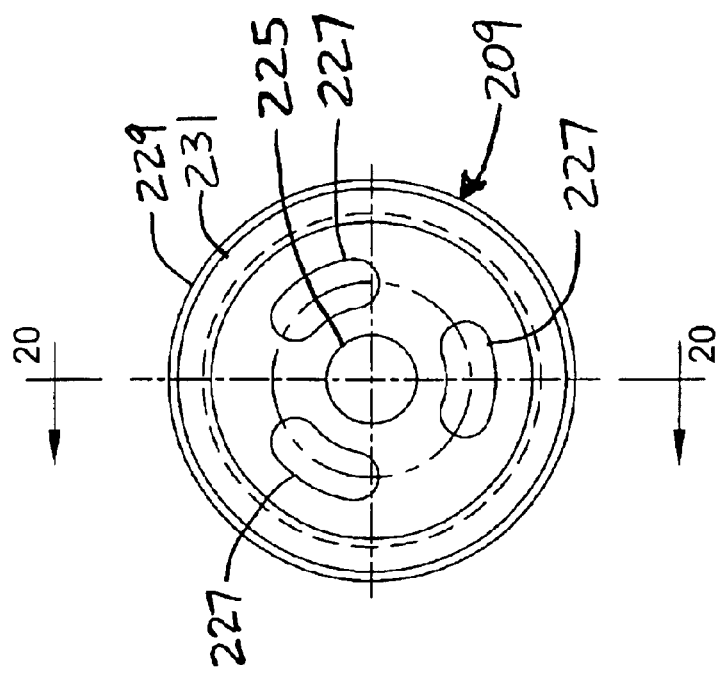
FIG. 19 is an end view of the dispensing piston.
Figure 22:
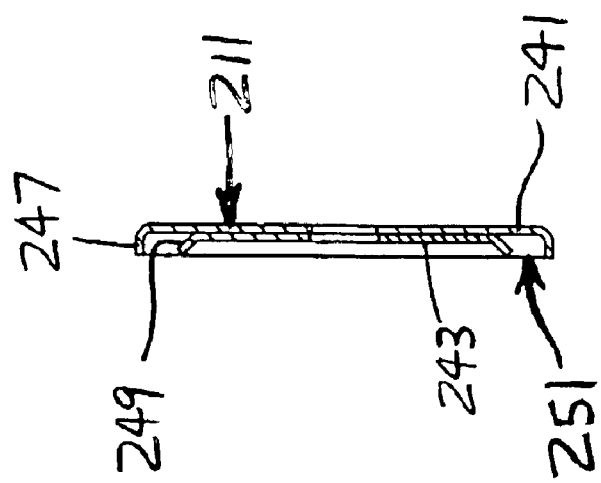
FIG. 22 is a section along line 22—22 of FIG. 21.
Figure 21:
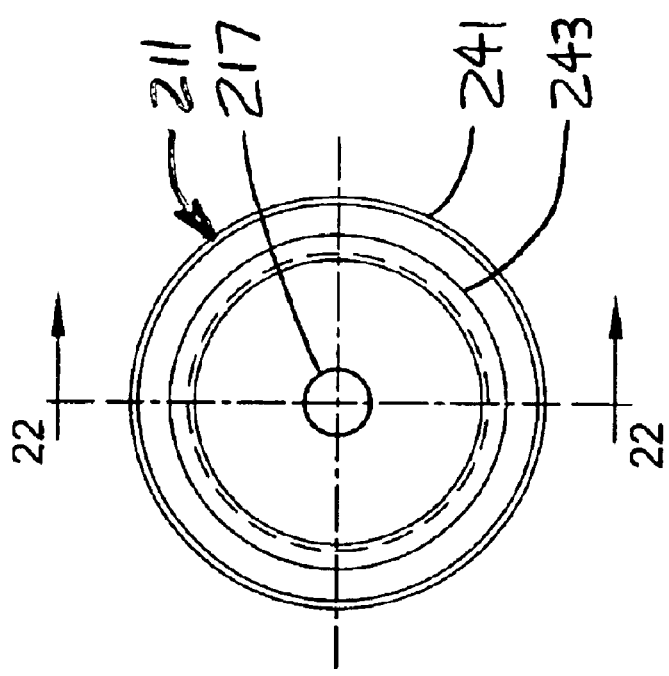
FIG. 21 is an end view of a seal.

The dispensing piston 209 has a simple, inexpensive construction including a flat, circular washer 229, a circular ring seat 231, and an outer sealing ring 233 (FIGS. 18–20). Both the washer 229 and the ring seat 231 are preferably formed by a metal stamping process and are secured together by spot welds in face-to-face relation. The ring seat 231 has a central hole that is the same size as the washer central hole and aligns in registration therewith to define the central hole 225 of the dispensing piston. The ring seat also has three flow-through holes spatially arranged around its center hole which are shaped and positioned to register with flow-through holes of the washer to define the flow-through holes 227. The stamping of the ring seat 231 forms an annular shoulder 235 around its periphery and an annular flange 237 which, together with the periphery of the washer, form an annular groove 239 that extends completely around the periphery of the dispensing piston 209. The groove 239 receives the sealing ring 233 therein and is dimensioned so that the sealing ring supported in the groove will slide in sealing engagement against the interior surface of the dispensing chamber 181.

The seal 211 plate also has a simple, inexpensive construction including a circular seal washer 241, a circular O-ring retainer 243, and an O-ring 245. Preferably both the seal washer 241 and the O-ring retainer 243 are formed by an inexpensive metal stamping process and are secured together by spot welds. The stamping process forms a peripheral flange 247 around the seal washer. The exterior diameter of the seal washer 241 is slightly smaller than that of the dispensing piston 209 so that it will not approach the interior surface of the dispensing chamber 181 when mounted on the plunger 9. The O-ring retainer 243 and seal washer 241 have center holes of the same size which are aligned in registration when the seal washer and O-ring retainer are secured together to define the central hole 217. The stamping of the O-ring retainer forms a flange around its periphery that has a tapered exterior surface 249 that angles radially inwardly toward the seal washer. The tapered flange surface 249 forms a circular edge at the outer periphery of the O-ring retainer 243 and also forms an annular groove 251 on a side of the seal plate 211 that faces the dispensing piston. The annular groove 251 is dimensioned slightly smaller than the diameter of the O-ring 245 that is received in the groove (FIG. 18) and the circular edge holds the O-ring securely in the annular groove. The O-ring 245 supported by the seal plate 211 has a diameter dimensioned large enough to completely surround the flow-through holes 227 of the dispensing piston.

In assembling the seal plate 211 onto the plunger 9, the tip 213 of the plunger is passed through the center hole 217. The nut 215 is received through the central hole 225 of the dispensing piston 209 and is rotated to engage the internal threads of the nut with the external threads of the tip. The nut 215 securely mounts the seal plate 211 to the plunger 9 in the position and orientation shown in FIGS. 17 and 18. This also mounts the dispensing piston 209 on the plunger 9 for sliding movement of the dispensing piston between the enlarged head 223 of the nut and the seal plate 211.

In operation, a fluid to be dispensed such as a lubricant, is supplied to the dispenser 177 through the dip tube 165. The fluid can be pumped through the dip tube from an external source or could be provided to the dispenser by other methods such as those discussed earlier in describing the operation of the grease gun 1. The supply of fluid passes through the supply passage 191 and into a right side R of the dispensing chamber 181 as viewed in FIG. 18, being to the right side of the dispensing piston 209. A source of air pressure is then connected to the air pressure inlet fitting 187. The dispenser is then ready for operation. This operation of the air motor 7 causes the plunger 9 to reciprocate through the plunger bore 185. The plunger 9 is retracted through the plunger bore in response to the air motor piston 52 being moved to its retracted position in the cylinder 54 and is advanced through the plunger bore in response to the piston 52 being advanced through the cylinder 54.

When the plunger 9 is moved to its retracted position it moves to the right as viewed in FIGS. 17 and 18. This movement causes the plunger 9 to also pull the seal plate 211 and the dispensing piston 209 to the right. The seal plate 211 and nut 215, being secured to the plunger 9, move with the plunger. However, the dispensing piston 209 is mounted for sliding movement on the exterior of the nut 215. As the plunger 9 is moved to the right, the dispensing piston will slide to the left relative to the plunger 9 to its charge position such as shown in FIG. 18. It can be seen that with the dispensing piston positioned at its charge position relative to the plunger 9, the seal plate 211 is spaced from the dispensing piston exposing the flow-through holes 227. This permits any fluid on the right side R of the dispensing chamber to pass around the periphery of the seal plate, through the flow-through holes 227 of the dispensing piston 209 and into a left side L of the dispensing chamber (being to the left of the dispensing piston as shown in FIG. 18). At the left side L, fluid is at a position ready for dispensing and the dispensing chamber 181 is charged. The dispensing piston 209 stops sliding to the left relative to the plunger upon engaging the head 223, and then it moves to the right along with the plunger.

When the plunger 9 is moved toward its advanced position, it moves to the left as viewed in FIGS. 17 and 18. As the plunger 9 moves to the left, the seal plate 211 secured to the plunger also moves to the left. However, the dispensing piston now slides across the nut exterior surface 221 toward the seal plate 211 until it occupies its discharge position relative to the plunger 9 where it abuts against the O-ring 245 of the seal. This seals closed the flow through holes 227 of the dispensing piston. As the plunger 9 continues to advance to the left as viewed in FIGS. 17 and 18, the dispensing piston 209 pressurizes any fluid on the left side L of the dispensing chamber (or pushes fluid) causing it to pass through the outlet 169 where it can be selectively dispensed. This leftward movement of the dispensing piston also creates a vacuum pressure drawing fluid through the dip tube 165 and refilling the right side R of the dispensing chamber 181 as the dispensing piston is moved.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A pump for dispensing a fluid comprising a pneumatic reciprocating motor, a dispenser, and a reciprocal plunger driven by said motor;

wherein said motor comprises:
    a motor cylinder having a head end and a rod end;
    a motor piston reciprocable in the cylinder, said motor piston having a forward and a back side, said motor piston being reciprocable through a forward stroke toward the rod end of the cylinder and a return stroke back toward the head end and being biased to return back through a return stroke;

said plunger extending forward from the motor piston through the rod end of the cylinder and being reciprocable by the motor piston;

said cylinder having an air inlet for admission of compressed air thereto on the back side of the motor piston for driving it forward through a forward stroke against the return bias and an air outlet on the forward side of the motor piston for venting air;

said motor piston having through passaging extending from its forward side to its back side;

a valve movable in the motor piston relative to the motor piston between a position blocking said through passaging and a position unblocking said through passaging;

said cylinder and motor piston having auxiliary passaging for delivery of air under pressure from the back side of the motor piston to move the valve to its said through-passaging-unblocking position at the conclusion of a forward stroke of the motor piston, the motor piston acting as a valve and opening said auxiliary passaging at the conclusion of the forward stroke of the motor piston;

and wherein said dispenser comprises:

a dispensing chamber;

a dispensing piston in the dispensing chamber and supported by the plunger for reciprocal movement in response to reciprocal movement of the plunger, the dispensing piston being further moveable relative to the plunger between a charge position for charging the dispensing chamber with fluid and a discharge position for discharging fluid from the dispensing chamber.

2. A pump as set forth in claim 1 wherein the dispensing piston has at least one flow-through hole passing through the dispensing piston, and further comprising a seal secured to the plunger in the dispensing chamber and positioned relative to the dispensing piston so that at its charge position, the dispensing piston is spaced from the seal such that fluid may flow through said hole, and at its discharge position the dispensing piston engages the seal preventing flow of fluid through said hole.

3. A pump as set forth in claim 2 further comprising an internal wall separating the dispensing chamber from the cylinder, a bore passing through the internal wall and the plunger extending from the piston through the bore into the dispensing chamber.

4. A pump as set forth in claim 2 wherein the plunger has a tip and further comprising a nut receivable on the tip, the nut having a smooth exterior surface and a head.

5. A pump as set forth in claim 4 wherein the tip has external threads and the nut has complementary internal threads.

6. A pump as set forth in claim 5 wherein the tip has a substantially solid construction free from an internal cavity.

7. A pump as set forth in claim 5 wherein the dispensing piston further comprises a central hole for receiving the nut with a slip fit such that the dispensing piston is mounted for sliding movement along the smooth exterior surface of the nut.

8. A pump as set forth in claim 6 wherein the dispensing piston is captured for movement along the plunger between the head of the nut and the seal.

9. An automatic pressure operated fluid dispenser comprising:

a dispensing chamber;

a reciprocally movable drive plunger, the plunger having a tip;

a dispensing piston in the dispensing chamber supported by the plunger for reciprocal movement in response to reciprocal movement of the plunger, the dispensing piston having at least one flow-through hole passing through the dispensing piston, the dispensing piston being further moveable relative to the plunger between a charge position for charging the dispensing chamber with fluid and a discharge position for discharging fluid from the dispensing chamber;

a seal in the dispensing chamber secured to the plunger for reciprocal movement along with reciprocal movement of the plunger, the seal positioned such that when the dispensing piston is at its charge position, the seal is spaced from the dispensing piston and fluid may flow through said flow-through hole, and when the dispensing piston is at its discharge position, it engages the seal preventing flow of fluid through said flow-through hole; and a nut receivable on the tip having a smooth exterior surface for supporting the dispensing piston and a head;

wherein the tip of the plunger has external threads and the nut has complementary internal threads for securement on the tip.

10. A fluid dispenser as set forth in claim 9 wherein the tip has a substantially solid construction free from an internal cavity.

11. A fluid dispenser as set forth in claim 9 wherein the dispensing piston further comprises a central hole for receiving the nut with a slip fit such that the dispensing piston is mounted for sliding movement along the smooth exterior surface of the nut.

12. A fluid dispenser as set forth in claim 11 wherein the dispensing piston is captured for movement along the plunger between the head of the nut and the seal.

* * * * *